United States Patent [19]

Weber

[11] Patent Number: 4,580,674

[45] Date of Patent: Apr. 8, 1986

[54] CONTROL ARRANGEMENT FOR THE ACTUATING PRESSURE APPLIED TO A CLUTCH AND/OR BRAKE OF A MECHANICAL PRESS

[75] Inventor: Heinz Weber, Wäschenbeuren, Fed. Rep. of Germany

[73] Assignee: L. Schuler GmbH, Fed. Rep. of Germany

[21] Appl. No.: 664,254

[22] Filed: Oct. 24, 1984

Related U.S. Application Data

[63] Continuation of Ser. No. 317,546, Nov. 2, 1981.

[30] Foreign Application Priority Data

Oct. 31, 1980 [EP] European Pat. Off. ........ 80106698.6

[51] Int. Cl.⁴ ........ F16D 67/02

[52] U.S. Cl. ........ 192/144

[58] Field of Search ........ 192/18 A, 12 C, 18 R, 192/144, 143

[56] References Cited

U.S. PATENT DOCUMENTS

| | | | |
|---|---|---|---|
| 2,635,727 | 4/1953 | Bitler | 192/20 |
| 2,734,609 | 2/1956 | Fritsch | 192/18 A |
| 2,911,080 | 11/1959 | Crane et al. | 192/18 A |
| 3,200,917 | 8/1965 | Herr et al. | 192/18 R |

FOREIGN PATENT DOCUMENTS

| | | |
|---|---|---|
| 1502319 | 4/1969 | Fed. Rep. of Germany . |
| 1577264 | 4/1970 | Fed. Rep. of Germany . |
| 1207725 | 7/1973 | Fed. Rep. of Germany . |
| 1121376 | 7/1968 | United Kingdom . |

*Primary Examiner*—George H. Krizmanich
*Attorney, Agent, or Firm*—Craig and Burns

[57] ABSTRACT

A control arrangement for a clutch and/or brake of a press, with the control arrangement including at least one of a clutch cylinder piston unit and a brake cylinder piston unit which opposes braking forces until a desired rotational speed is reached. The cylinder-piston units may be operationally controlled by at least one valve before the desired rotational speed is reached. The control arrangement is driven by at least two different pressures, with one of the pressures being at least approximately equal to a maximum clutch pressure or at least approximately equal to a pressure release, and the other pressure being a partial pressure which lies above a minimum response pressure of the clutch or below a counter pressure which triggers a minimal response pressure of the brake. After an intermediate pressure is reached which, in the case of a clutch operation, lies between a value above the partial pressure and the clutch pressure, and with a brake operation, between a value below the partial pressure and a pressure release and, during a clutching and braking operation the pressure may still be switched, prior to a reaching of the desired rotational speed, to the partial pressure for a time period that it takes to obtain the desired rotational speed. The control arrangement may also be utilized in a combination clutch-brake construction with the respective pressures being set in the control arrangements on the basis of a program control which is operable in dependence upon operating parameters of the press.

18 Claims, 7 Drawing Figures

CONTROL ARRANGEMENT FOR THE ACTUATING PRESSURE APPLIED TO A CLUTCH AND/OR BRAKE OF A MECHANICAL PRESS

This is a continuation of application Ser. No. 317,546, filed Nov. 2, 1981.

The present invention relates to a control arrangement and, more particularly, to a control arrangement for a clutch and/or brake of a main drive shaft of a press, with the control means including a clutch cylinder and/or braking cylinder opposing a brake force until a desired rotational speed, for example, a predetermined operating speed or a standstill, is reached which can be operationally controlled by means of at least one valve before the desired rotational speed is reached. The control arrangement is driven by at least two different pressures with one of the pressures being at least close to a maximum clutching pressure or at least approximately a pressure release, with the other pressure being a partial pressure which lies above a minimum response pressure of the clutch or below a counter pressure which raises a minimum response pressure of the brake.

Control arrangements of the aforementioned type for a clutch and a brake are respectively disclosed in, for example, Offenlegungsschrift Nos. 15 02 319 and 15 77 264, which correspond to British Pat. No. 1,121,376, wherein at least in a normal operation, at first a partial pressure and only thereafter at least an approximate maximum clutch pressure or at least an approximate pressure release is established thereby resulting in a delay of the clutch pressure build up and a dissipation of a counter pressure.

While the above proposed control arrangements enable a smoother engagement of the clutch or brake at a beginning of a clutching or braking operation, a disadvantage resides in the fact that, upon a stopping of the clutching or braking operation, at least the approximate maximum clutch pressure or at least an approximate pressure release is present so that when the desired rotational speed is reached a much more abrupt transition to synchronization with the operating speed or a standstill occurs.

Measurements have established that the abrupt transition is a major cause of vibration of the drive elements of the press and the vibration of a press ram thereby creating a considerable disturbing noise level during operation of the press.

The aim underlying the present invention essentially resides in avoiding abrupt transition by ensuring that a smooth transition can occur to a desired rotational speed whether an operating speed, or a standstill of the shaft, without requiring excessive delay of the entire clutching or braking process.

In accordance with advantageous features of the present invention, a temporary adjustment is made of a partial pressure during a time necessary to bring the shaft of the press to desired rotational speed, i.e., operating speed or standstill. For this purpose, a control of the aforementioned type is provided wherein, during a clutching or a braking, after achieving an intermediate pressure, which in a clutching operation lies between a value considerably above the partial pressure, for example, at least 40%, and the maximum clutching pressure and, during a braking operation, between a value considerably below the partial pressure, for example, at least 40%, and a complete pressure release, the pressure may still be switched to a partial pressure before the desired rotational speed, i.e., operating speed or standstill is reached for a period of time which it takes to reach the desired rotational speed.

An abrupt actuation of the clutch or brake and an abrupt build up of a high clutching or braking moment in a beginning of the clutching or braking process is a result of the fact that, at first, the higher clutching or lower braking, compared with the partial pressure, an intermediate pressure is injected. The subsequent shift to a lower clutching or higher braking partial pressure leads to a decrease of the clutching or braking moment until the desired rotational speed, i.e., operating speed or standstill, is reached thereby achieving a desirable smoother transition. Subsequently, at least an approximate maximum clutch pressure or at least an approximate pressure release must be adjusted so that the complete clutching moment for an operation of the press or the complete braking moment for an arresting of the press ram and associated drive elements is available.

Since a shift between various pressures does not occur without inertia, i.e., erratically, in accordance with further features of the present invention, it is advantageous to carry out the switching from the intermediate pressure to the partial pressure in increments.

However, a more practical approach resides in providing the control arrangement with a time control device which works on a rotational speed, angle, time, or pressure and, during an engagement or operating time of the time control device, the partial pressure would be effective. The operative intervention of the time control device and engagement or operation time should be measured so that the desired rotational speed, i.e., operating speed, or standstill, is reached while the partial pressure is effective.

In accordance with further features of the present invention, by use of a proportional pressure release valve situated forwardly of the clutch or brake cylinder which, on a basis of a program control adjusts the pressures shifts between the various pressures may be made with smoother transition so that resultant vibrations are minimized. The control arrangement of the present invention may be used equally effectively in a press main drive shaft having a clutch-braking combination such as disclosed in, for example, commonly assigned co-pending U.S. application Ser. No. 247,739 as well as German Pat. No. 12 07 725 and corresponding U.S. Pat. No. 3,200,917 wherein one cylinder simultaneously forms a clutch and brake cylinder, with the cylinder guiding a piston which alternately effects a clutching and braking operation.

Accordingly, it is an object of the present invention to provide a control arrangement for a clutch and/or brake of a press which avoids, by simple means, shortcomings and disadvantages encountered in the prior art.

Another object of the present invention resides in providing a control arrangement for a clutch and/or brake of a press which minimizes if not avoids the generation of vibrations in the drive elements of the press and press ram.

Yet another object of the present invention resides in providing a control arrangement for a clutch and/or brake of a press which minimizes a delaying of the clutching and/or braking operation.

A still further object of the present invention resides in providing a control arrangement for a clutch and/or brake of a press which enables a smooth synchronized transistion upon the attainment of a desired rotational speed of the press.

Yet another object of the present invention resides in providing a control arrangement for a clutch and/or brake of a press which functions reliably under all operating conditions of the press.

These and other objects, features, and advantages of the present invention will become more apparent from the following description when taken in connection with the accompanying drawings which show, for the purposes of illustration only, several embodiments in accordance with the present invention, and wherein.

Figure 4:
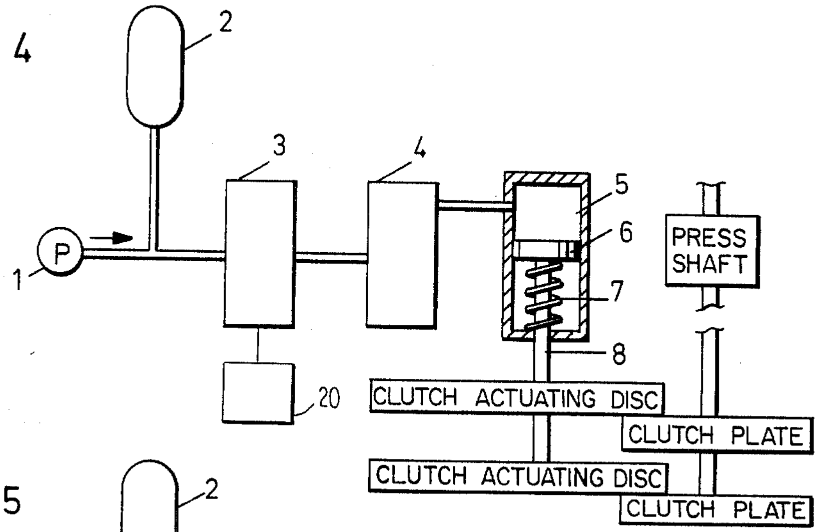
FIG. 4 is a schematic view of a clutch control arrangement constructed in accordance with the present invention.
Figure 5:
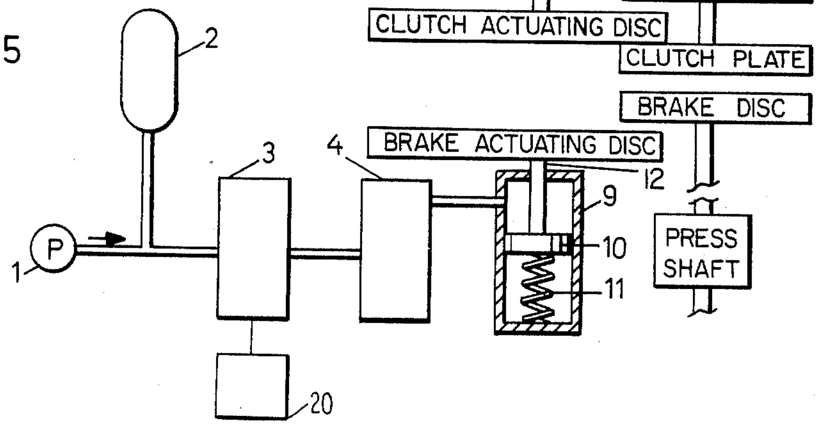
FIG. 5 is a schematic view of a brake control arrangement constructed in accordance with the present invention.
Figure 6:
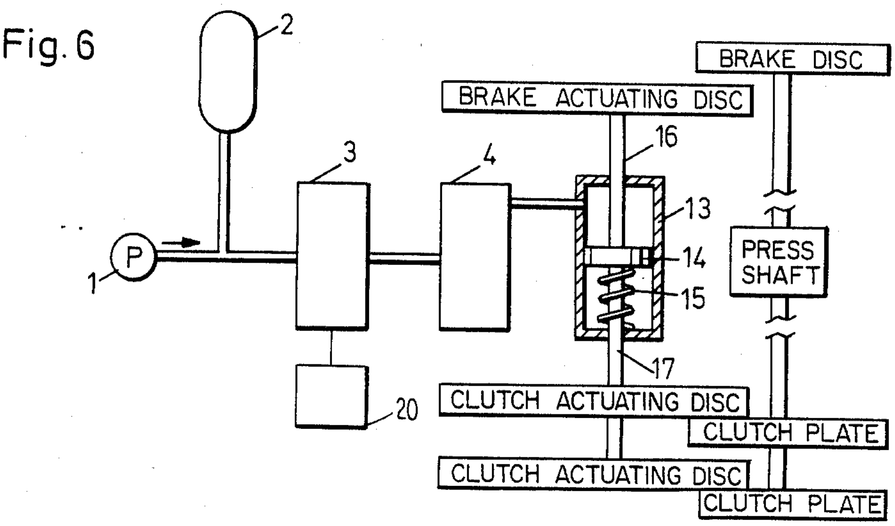
FIG. 6 is a schematic view of a control arrangement for a clutch-brake combination constructed in accordance with the present invention.

Referring now to the drawings wherein like reference numerals are used throughout the various views to designate like parts and, more particularly, to FIGS. 4–6, according to these figures, the control arrangements include a pressure source having a pressure medium supply 1 and a pressure medium reservoir 2, with the pressure source being connected, by way of a pressure reducing valve 3, of conventional construction, and a conventional press safety valve 4, to a cylinder in which is displacably guided a piston. The pressure reducing valve 3 is influenced or controlled by a time control or program control device 20.

As shown in FIG. 4, a clutch piston 6 is displacably guided in a clutch cylinder 5, with the clutch piston 6 being actuated by a pressure spring 7 in the open or disengaged mode of the clutch, with the clutch piston 6 acting in a closing direction of the clutch through a piston rod 8.

As shown in FIG. 5, a brake piston 10 is displacably guided in a brake cylinder 9, with the brake piston 10 being actuated in a closed or braking mode by a pressure spring 11, and acting in an opening direction of the brake through a piston rod 12.

FIG. 6 provides an example of a clutch-brake combination wherein a cylinder 13, which at the same time forms a clutch and brake cylinder, has displacably guided therein a clutch and brake piston 14, with a pressure spring 15 acting on the piston 14 in an opening direction of the clutch and the closing direction of the brake. Piston rods 16, 17 are provided on respective sides of the piston 14. The piston rod 16 on the cylinder side influences the brake in an opening direction while the piston rod 17 disposed on the spring side of the clutch brake combination influences the clutch in a closing or engaging direction. In such a dual clutch and brake combination, movement of the actuating piston 14 downwardly by application of pressure above the piston causes the clutch to be actuated while disengaging the brake. Relieving of the pressure on top of the piston 14 causes spring 15 to move piston 14 upwards, thus engaging the brake and releasing the clutch. Details of such a dual function piston actuated brake and clutch combination can be found in German Patentschrift No. 12 07 725 and U.S. Pat. No. 3,200,917, referenced earlier.

Figure 7:
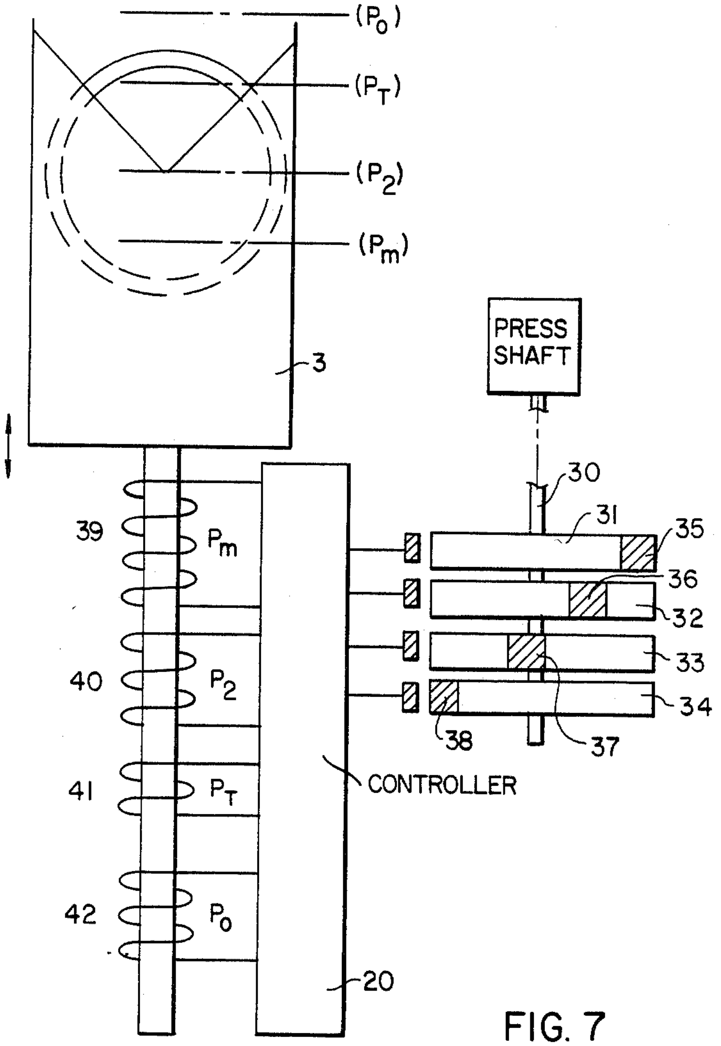
FIG. 7 is a schematic view of the details of the pressure reducing valve and control therefor.

FIG. 7 shows a schematic detail of a valve and controller unit which could be used in the device of FIGS. 4–6. The valve is of the type referenced in German Offenlegungsschrift No. 15 77 264 and British Pat. No. 11 21 376 referenced earlier and the control is of the type shown in U.S. Pat. No. 2,635,727. Herein, a pressure reducing V-slotted valve 3 moves up and down to open the pressure source 2 to the piston 14 (see FIGS. 4–6). The valve can assume one of several positions providing piston actuating pressure $P_T$, $P_2$, $P_m$ or $P_o$, respectively, by opening up of the pressure source inlet to the piston 14 and thus reducing the pressure from source 2 less and less as the valve is opened. FIG. 7 shows the relative positions for each of the pressures $P_T$, $P_2$ and $P_m$. A rotating commutator shaft 30 with 4 commutator discs 31–34 is connected to the press motor shaft to be driven thereby. Each commutator shaft has a conducting portion 35–38, respectively, which electrically and sequentially actuate valve moving solenoids 39–42, respectively. Dependent on the number of turns and the direction on the solenoids, the valve is shifted downwardly to positions corresponding to reduce pressures $P_T$, $P_2$ and $P_m$ or upward to the position producing no pressure $P_o$ as indicated.

Figure 1:
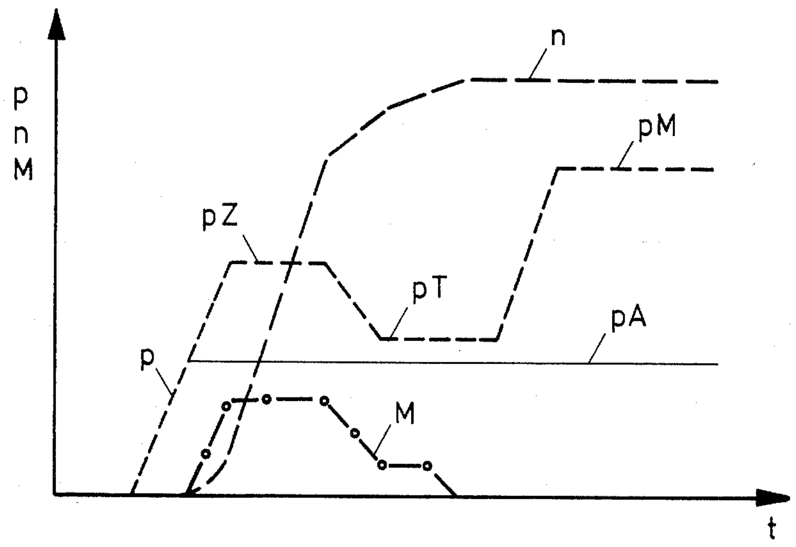
FIG. 1 is a pressure flow, rotational speed, and moment diagram plotted over time for a clutch control arrangement in accordance with the present invention.
Figure 2:
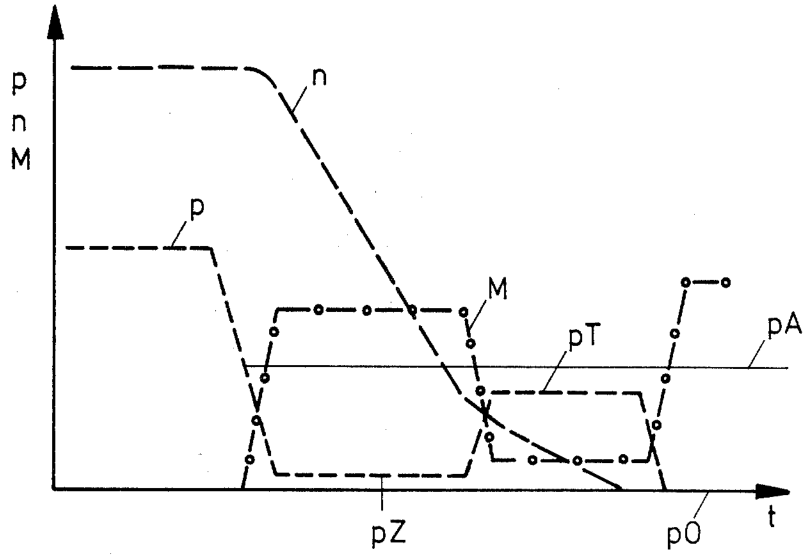
FIG. 2 is a pressure flow, rotational speed and moment diagram plotted over time for a brake control arrangement in accordance with the present invention.
Figure 3:
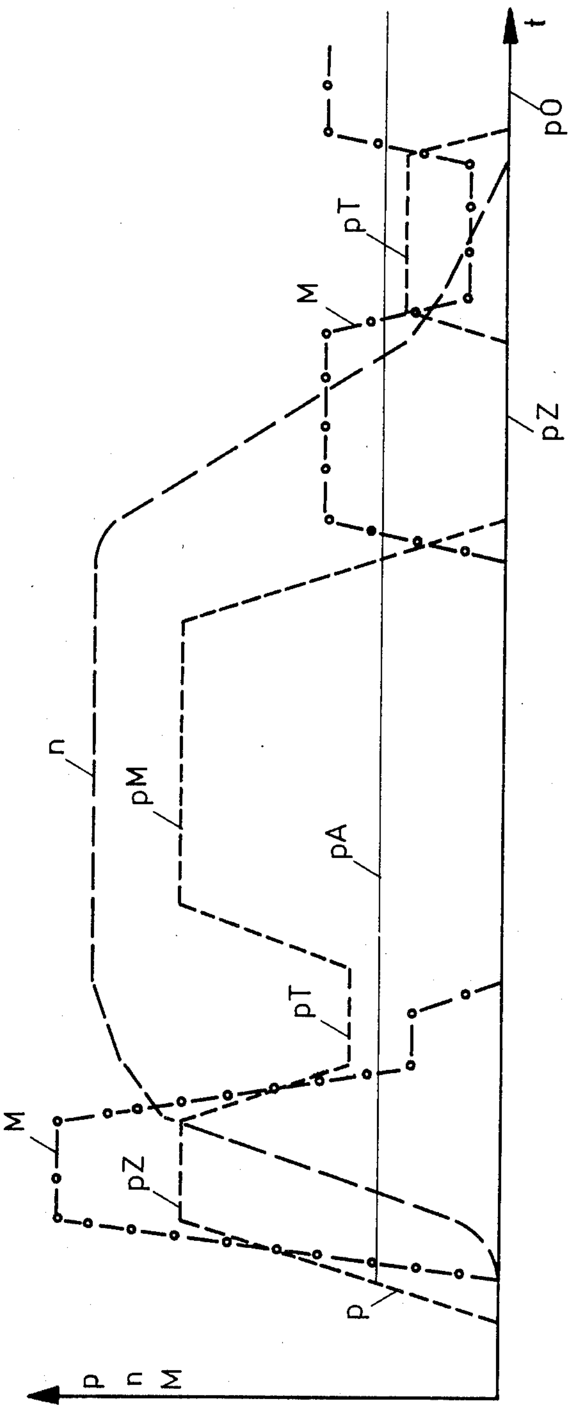
FIG. 3 is a pressure flow, rotational speed and moment diagram plotted over time for a combination clutch-brake control arrangement in accordance with the present invention.

Referring now to FIGS. 1, 2, and 3, wherein p represents a pressure flow, n represents a rotational speed (rpm), M represents a moment, and t represents time, according to these figures, a minimum response pressure in each of the diagrams is represented by a horizontal line designated pA. In each of the four operations of the clutch (left side FIGS. 1 and 3) and of the brake (right side of FIGS. 2 and 3), an intermediate pressure designated pZ is first set, whereby there is a rapid rise of the clutching or braking moment M to a relatively high value. A subsequent shift to a partial pressure pT, in each case, leads to a dropping of the clutching or braking moment M to a lower value which is maintained until a desired rotational speed n, i.e., an operating speed or a standstill of a drive of the press, is achieved. Thereafter, the pressure p is switched back to the maximum clutch or braking pressure pM or a pressure release pO.

While I have shown and described several embodiments in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. A control arrangement for at least one of a clutch and brake on a main drive shaft of a press, the control arrangement including pressure responsive clutch and brake piston means for actuating at least one of said clutch and brake for controlling the rotational speed of the main drive shaft, comprising driving means for applying at least three different pressure levels to said pressure responsive means for each cycle of press operation in the following order:

an intermediate pressure less than a maximum clutch actuation pressure and a complete brake release pressure;

a partial pressure which is greater than a minimum response pressure of the clutch and less than a counterpressure for triggering a minimum response pressure of the brake and wherein this partial pressure is less than said intermediate pressure; and maximum actuation pressure for actuation of the clutch and release of the brake, wherein smooth transition between different rotation speeds is accomplished by applying the intermediate pressure, then the partial pressure and finally the maximum pressure to the pressure responsive piston means.

2. A control arrangement according to claim 1, characterized in that the value for the intermediate pressure for the clutch operation is at least 40% above the partial pressure, and in that the value for the intermediate pressure for the brake operation is at least 40% below the partial pressure.

3. A control arrangement according to claim 1, characterized in that the driving means includes a pressure medium source and a control valve means for controlling a supply of pressure medium.

4. A control arrangement according to claim 3, characterized in that the control valve means is a pressure reducing valve arranged between the pressure medium source means and the brake and clutch cylinder piston means for setting the respective pressures.

5. A control arrangement according to claim 4, characterized in that the brake and clutch cylinder-piston means are formed of a single cylinder having a piston displacably guided therein for alternately effecting the brake and clutch operation.

6. A control arrangement according to claim 1, characterized in that the driving means includes a pressure medium source and a pressure reducing valve arranged between the pressure medium source and the brake and cylinder piston means for setting the respective pressures.

7. A control arrangement according to claim 1, characterized in that the brake and clutch cylinder-piston means are formed of a single cylinder having a piston displacably guided therein for alternately effecting the brake and clutch operation.

8. A control arrangement according to claim 2, wherein the driving means includes a pressure medium source and a control valve means for controlling a supply of pressure medium.

9. A control arrangement according to claim 2, wherein the driving means includes a pressure medium source and a pressure reducing valve arranged between the pressure medium source and the brake and cylinder piston means for setting the respective pressures.

10. A control arrangement according to claim 2, wherein the brake and clutch cylinder-piston means are formed of a single cylinder having a piston displaceably guided therein for alternately effecting the brake and clutch operation.

11. The method of operating the actuation motor for at least one of a clutch or brake for the drive mechanism of a press through a single cycle of operation, comprising the sequential steps of:

first, applying almost no pressure to the actuation motor, which pressure would cause actuation of the brake and release of the clutch;

second, applying an intermediate actuation pressure to the actuation motor of a pressure less than a maximum actuation pressure, which would cause actuation of the clutch and release of the brake;

thirdly, applying a partial actuation pressure to the actuation motor of a pressure, less than the pressure at step two and more than the pressure at step one, which partial pressure is greater than a minimum response pressure of the clutch and less than a counterpressure for triggering a minimum response pressure of the brake;

fourthly, applying pressure to the actuation motor of the maximum clutch actuation and brake release pressure.

12. The method according to claim 11, wherein the value of the pressure at the second step is at least 40% above the value of the pressure at the third step.

13. The method according to claim 11, wherein the pressures applied to the actuation motor acts against a bias force for engaging a clutch to drive the press.

14. The method according to claim 12, wherein the pressures applied to the actuation motor acts against a bias force for engaging a clutch to drive the press.

15. The method according to claim 11, wherein the pressure applied to the motor acts against a bias force for allowing releasing of a brake on the drive of the press.

16. The method according to claim 12, wherein the pressure applied to the motor acts against a bias force for allowing releasing of a brake on the drive of the press.

17. The method according to claim 11, wherein the pressures applied to the motor acts against a bias force for simultaneously engaging a clutch to drive the press while releasing a brake on the drive of the press.

18. The method according to claim 12, wherein the pressures applied to the motor acts against a bias force for simultaneously engaging a clutch to drive the press while releasing a brake on the drive of the press.

* * * * *